US012679730B2

(12) United States Patent
Zhang et al.

(10) Patent No.: US 12,679,730 B2
(45) Date of Patent: Jul. 14, 2026

(54) LITHIUM NICKEL MANGANESE-CONTAINING COMPOSITE OXIDE, METHOD FOR PREPARATION THEREOF, POSITIVE ELECTRODE PLATE, SECONDARY BATTERY AND ELECTRICAL DEVICE

(71) Applicant: CONTEMPORARY AMPEREX TECHNOLOGY (HONG KONG) LIMITED, Hong Kong (CN)

(72) Inventors: Zhenguo Zhang, Ningde (CN); Sihui Wang, Ningde (CN); Jingpeng Fan, Ningde (CN); Yutong Liu, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 155 days.

(21) Appl. No.: 18/888,176

(22) Filed: Sep. 18, 2024

(65) Prior Publication Data

US 2025/0011172 A1     Jan. 9, 2025

Related U.S. Application Data

(63) Continuation of application No. PCT/CN2022/117827, filed on Sep. 8, 2022.

(51) Int. Cl.
*C01B 25/30* (2006.01)
*C01G 45/1214* (2025.01)
(Continued)

(52) U.S. Cl.
CPC ........ *C01B 25/306* (2013.01); *C01G 45/1214* (2013.01); *C01G 53/54* (2013.01);
(Continued)

(58) Field of Classification Search
None
See application file for complete search history.

(56) References Cited

U.S. PATENT DOCUMENTS

2018/0261841 A1     9/2018  Mitsumoto et al.
2018/0294481 A1*  10/2018  Wohlfahrt-Mehrens ....................
                                                    H01M 10/0525
2021/0143421 A1*   5/2021  Mitsumoto ............ C01G 53/82

FOREIGN PATENT DOCUMENTS

CN      101841018  A     9/2010
CN      102800840  A    11/2012
(Continued)

OTHER PUBLICATIONS

Machine translation of CN 113517439, Oct. 2021.*
(Continued)

*Primary Examiner* — Jonathan Crepeau
(74) *Attorney, Agent, or Firm* — XSENSUS LLP

(57) ABSTRACT

The present application provides a lithium nickel manganese-containing composite oxide, a preparation method thereof, and a positive electrode plate, a secondary battery and an electrical device. The lithium nickel manganese-containing composite oxide is a particle with a monocrystal morphology or a quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2 \le x \le 0.5$, $-0.2 \le y \le 0.2$, $0 \le z \le 0.2$, $0 < a \le 0.2$, $0 \le k \le 0.2$, A includes one or more selected from Si, P and S, M includes one or more selected from a metal-doping element. The lithium nickel manganese-containing composite oxide provided in the present application may improve the capacity exertion, energy density and cycling life of the secondary battery.

15 Claims, 3 Drawing Sheets

(51) Int. Cl.

| | |
|---|---|
| *C01G 53/54* | (2025.01) |
| *H01M 4/505* | (2010.01) |
| *H01M 4/525* | (2010.01) |
| *H01M 10/0525* | (2010.01) |

(52) U.S. Cl.
CPC ........... *H01M 4/505* (2013.01); *H01M 4/525* (2013.01); *H01M 10/0525* (2013.01); *C01P 2002/32* (2013.01); *C01P 2004/32* (2013.01); *C01P 2004/61* (2013.01); *C01P 2006/11* (2013.01); *C01P 2006/12* (2013.01)

(56) References Cited

FOREIGN PATENT DOCUMENTS

| | | |
|---|---|---|
| CN | 101910066 B | 2/2013 |
| CN | 102244257 B | 2/2014 |
| CN | 106450282 A | 2/2017 |
| CN | 104425814 B | 3/2017 |
| CN | 106784795 A | 5/2017 |
| CN | 105016394 B | 3/2018 |
| CN | 110402239 A | 11/2019 |
| CN | 113285068 A | 8/2021 |
| CN | 113517439 A | 10/2021 |
| JP | 2014-197552 A | 10/2014 |
| JP | 2020-102431 A | 7/2020 |

OTHER PUBLICATIONS

International Search Report and Written Opinion mailed on Feb. 16, 2023, received for PCT Application PCT/CN2022/117827, filed on Sep. 8, 2022, 11 pages including English Translation.

Extended European Search Report issued Apr. 10, 2025 in European Patent Application No. 22957730.9.

Deng Yu-Feng et al: Impact of P-Doped in Spinel LiNi0.5Mn1.5O4 on Degree of Disorder, Grain Morphology, and Electrochemical Performance, Chemistry of Materials, [Online], vol. 27, No. 22, Nov. 10, 2015, pp. 7734-7742, XP093261666, US, ISSN: 0897-4756, DOI: 10.1021/acs.chemmater.5b03517 Retrieved from the Internet: URL:https://pubs.acs.org/doi/full/10.1021/acs.chemmater.5b03517>, [retrieved on Mar. 20, 2025].

Notice of the Granting of a Patent Right for an Invention issued Nov. 7, 2025 in Chinese Patent Application No. 202280091291.2 with English translation thereof.

* cited by examiner

5
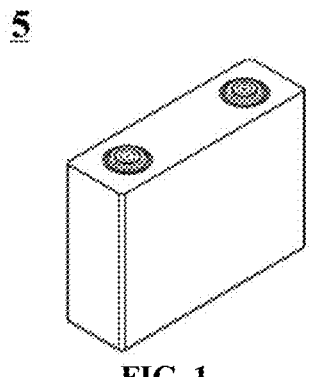
FIG. 1
5
53
52
52
51
FIG. 2
4      5   5
5
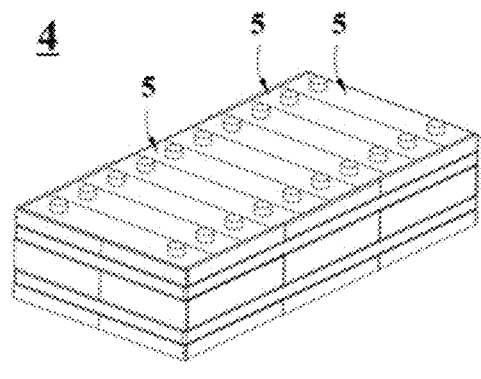
FIG. 3

1

1

LITHIUM NICKEL MANGANESE-CONTAINING COMPOSITE OXIDE, METHOD FOR PREPARATION THEREOF, POSITIVE ELECTRODE PLATE, SECONDARY BATTERY AND ELECTRICAL DEVICE

CROSS-REFERENCE TO RELATED APPLICATION

This application is a continuation of International Application No. PCT/CN2022/117827, filed on Sep. 8, 2022, which is hereby incorporated by reference in its entirety.

TECHNICAL FIELD

The present application belongs to the technical field of batteries, specifically a lithium nickel manganese-containing composite oxide, a method for the preparation thereof, a positive electrode plate, a secondary battery and an electrical device.

BACKGROUND

In recent years, secondary batteries have been widely used in energy storage power systems such as hydro, thermal, wind and solar power plants, as well as electric tools, electric bicycles, electric motorcycles, electric vehicles, military equipment, aerospace and many other fields. With the application and promotion of secondary batteries, the demand for secondary batteries with high energy density, safety, reliability and low cost is increasing. Cobalt-free spinel type $LiNi_{0.5}Mn_{1.5}O_4$ has become one of the most popular positive electrode active materials due to its high energy density, good thermal stability and low cost. However, its high operating voltage hindered its compatibility with conventional electrolytic solutions, which may lead to serious side reactions and cause the deterioration of the interface between the positive electrode and the electrolytic solution, thereby hindering its practical application.

SUMMARY

An object of the present application is to provide a lithium nickel manganese-containing composite oxide, a preparation method thereof, and a positive electrode plate, a secondary battery and an electrical device, which may improve the capacity exertion, energy density and cycling life of the secondary battery.

A first aspect of the present application provides a lithium nickel manganese-containing composite oxide, wherein the lithium nickel manganese-containing composite oxide is a particle with a monocrystal morphology or a quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2\leq x\leq 0.5$, $-0.2\leq y\leq 0.2$, $0\leq z\leq 0.2$, $0<a\leq 0.2$, $0\leq k\leq 0.2$, A comprises one or more selected from Si, P and S, M comprises one or more selected from a metal-doping element, optionally one or more selected from Ti, Cr, Mo, Nb, Ru, Te, Ta, W, Ce, Y and Yb.

The lithium nickel manganese-containing composite oxide provided in the present application may achieve the maximum reductions of a corrosion of an electrolytic solution, a side reaction at the interface between a positive electrode and an electrolytic solution, and an impedance of the interface between a positive electrode and an electrolytic solution, so that the lithium nickel manganese-containing composite oxide provided in the present application may have good entire performance such as higher specific capacity and cycling stability, and the secondary battery may have improved capacity exertion, energy density and cycling life.

In some embodiments of the present application, a ratio of long diameter L to short diameter S of the lithium nickel manganese-containing composite oxide grain satisfies $1.0\leq L/S\leq 1.25$, optionally, $1.0\leq L/S\leq 1.15$. As a result, the lithium nickel manganese-containing composite oxide may have a smaller rate of stress corrosion.

In some embodiments of the present application, M comprises one or more selected from Mo, Nb, Ru, Te, Ta, Ce and Yb, optionally two or more selected from Mo, Nb, Ru, Te, Ta, Ce, and Yb. In addition to promoting the degree of roundness of grain shape of lithium nickel manganese-containing composite oxide, these doping elements M may also form strong bonds with oxygen, and therefore, it may enhance the structural stability and reduce oxygen defects of lithium nickel manganese-containing composite oxide, and further enable the lithium nickel manganese-containing composite oxide and secondary battery to have better electrochemical performance.

In some embodiments of the present application, $0.01\leq a\leq 0.2$, optionally, $0.01\leq a\leq 0.1$. If the doping element A is present in a content within a suitable range, it is favorable for the secondary battery to have good dynamic performance and long service life.

In some embodiments of the present application, $0<z\leq 0.2$, optionally, $0.005\leq z\leq 0.1$. If the doping element M is present in a content within a suitable range, it is favorable for the secondary battery to have good dynamic performance and long service life.

In some embodiments of the present application, $0.01\leq z+a\leq 0.2$, optionally, $0.01\leq z+a\leq 0.15$. If the total amount of the doping element A and the doping element M are in a suitable range, it is favorable for the lithium nickel manganese-containing composite oxide and the secondary battery to have better electrochemical performance.

In some embodiments of the present application, $0<z\leq 0.2$ and $1\leq a/z\leq 5$, optionally, $0<z<0.2$ and $2\leq a/z\leq 4$. If the ratio of the doping element A to the doping element M is in a suitable range, it may achieve the maximum reductions of a corrosion of an electrolytic solution, and enable the lithium nickel manganese-containing composite oxide and secondary battery to have better electrochemical performance.

In some embodiments of the present application, the lithium nickel manganese-containing composite oxide has a 4V plateau charging capacity ratio R satisfying $0<R\leq 0.125$, optionally, $0.03\leq R<0.105$. The 4V plateau charging capacity ratio R of the lithium nickel manganese-containing composite oxide is measured as follows: assembling a button battery with an electrode plate comprising the lithium nickel manganese-containing composite oxide as a positive electrode and a lithium plate as a negative electrode, charging the battery to 4.95V at a current of 0.1 C, and then charging to a current of 0.05 C at the constant voltage, using a ratio of the charging capacity in the range of 3.5V to 4.4V to the total charging capacity of the button battery as the 4V plateau charging capacity ratio R of the lithium nickel manganese-containing composite oxide. The lithium nickel manganese-containing composite oxide provided in the present application may be applied to systems with a high voltage of above 4.5V, and its charging capacity is lower at low voltage (e.g., 3.5V-4.4V) and higher at high voltage, so it can give full play to its advantages of large capacity at high voltage, and make the secondary battery to have high energy density.

In some embodiments of the present application, the lithium nickel manganese-containing composite oxide has a volume particle size Dv50 satisfying 3 $\mu m \leq Dv50 \leq 16$ $\mu m$, optionally, 5 $\mu m \leq Dv50 \leq 13$ $\mu m$. As a result, it is favorable for the secondary battery to have good dynamic performance and long service life.

In some embodiments of the present application, the lithium nickel manganese-containing composite oxide has a BET specific surface area S0 of $\leq 0.8 m^2/g$, optionally, 0.1 $m^2/g \leq S0 \leq 0.5$ $m^2/g$. As a result, it is favorable for the secondary battery to have good dynamic performance and long service life.

In some embodiments of the present application, the lithium nickel manganese-containing composite oxide has a tap density TD satisfying 1.5 $g/cm^3 \leq TD \leq 3.0$ $g/cm^3$, optionally, 1.7 $g/cm^3 \leq TD \leq 2.3$ $g/cm^3$. As a result, it is favorable for the secondary battery to have higher energy density.

In some embodiments of the present application, the lithium nickel manganese-containing composite oxide further has a cladding layer on the surface. It may further improve the structural stability of the lithium nickel manganese-containing composite oxide, reduce the direct contact between the lithium nickel manganese-containing composite oxide and the electrolytic solution, and reduce the leaching out of manganese ions, so as to be favorable for the secondary battery to have a longer service life.

In some embodiments of the present application, the cladding layer comprises one or more selected from a conductive carbon material, a metal oxides, a metal fluoride and a polyanionic material. Optionally, the conductive carbon material comprises one or more selected from soft carbon, hard carbon, graphene and graphene oxide. Optionally, the metal oxide comprises one or more selected from $Al_2O_3$, $B_2O_3$, $TiO_2$, $ZrO_2$, $WO_3$, $MoO_3$, $Y_2O_3$, $Ta_2O_5$, $TeO_2$, and $Nb_2O_5$. Optionally, the metal fluoride comprises one or more selected from LiF, $AlF_3$, and $GaF_3$. Optionally, the polyanionic material comprises one or more selected from orthophosphates and fluoro-orthophosphates of at least one element of Li, Ni, Co, Mn, Fe, Nb, Mo, W, Ta and Te, more optionally one or more of $LiNiPO_4$, $LiPO_2F_2$ and $Li_2PO_3F$.

A second aspect of the present application provides a preparation method of a lithium nickel manganese-containing composite oxide comprising the following steps: S1: providing a raw material obtained by mixing a source of element Li, a source of element Ni, a source of element Mn, a source of element A, and an optional source of element M in a predetermined proportion; S2: heating the raw material obtained in S1 to a first temperature T1 under an oxygen-containing atmosphere, maintaining at the first temperature T1 for a first time t1, cooling to room temperature, after which a intermediate product is obtained, 850° C.$\leq T1 \leq 1100°$ C.; and S3: heating the intermediate product obtained in S2 to a second temperature T2 under an oxygen-containing atmosphere, maintaining at the second temperature T2 for a second time t2, after which a lithium nickel manganese-containing composite oxide is obtained, 0° C.$\leq T1-T2 \leq 200°$ C., and T2$\geq 800°$ C., wherein the lithium nickel manganese-containing composite oxide is a particle with a monocrystal morphology or quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2 \leq x \leq 0.5$, $-0.2 \leq y \leq 0.2$, $0 \leq z \leq 0.2$, $0 < a \leq 0.2$, $0 \leq k \leq 0.2$, A comprises one or more selected from Si, P and S, M comprises one or more selected from a metal-doping element, optionally one or more selected from Ti, Cr, Mo, Nb, Ru, Te, Ta, W, Ce, Y and Yb.

In the preparation method of the present application, the first temperature T1 during the first sintering satisfies 850° C.$\leq T1 \leq 1100°$ C., thus ensuring that the grain grows to the target size and the grain structure is complete. By controlling the temperature T2 during the second sintering to be less than or equal to the temperature T1 during the first sintering, it promotes the micro-powders in the intermediate products obtained after the first sintering to recrystallize while avoiding the recrystallization of large grains, thus ensuring that the grain of the lithium nickel manganese-containing composite oxide to be rounded spherical or spherical-like shape.

In some embodiments of the present application, 900° C.$\leq T1 \leq 1100°$ C., optionally, 950° C.$\leq T1 \leq 1100°$ C. As a result, it is beneficial for the lithium nickel manganese-containing composite oxide grain to grow to the target size, and have a suitable particle size and specific surface area, and is beneficial for the lithium nickel manganese-containing composite oxide to have an intact grain structure, so that the secondary battery may have better cycling performance.

In some embodiments of the present application, 0° C.$\leq T1-T2 \leq 100°$ C., and 850° C.$\leq T2 \leq 1000°$ C., optionally 0° C.$< T1-T2 \leq 100°$ C., and 850° C.$\leq T2 \leq 1000°$ C. As a result, it is beneficial for the lithium nickel manganese-containing composite oxide to have higher degree of roundness and sphericity of the grain shape, so that the oxide is more resistant to strong acid corrosion in the electrolytic solution and stress corrosion at high voltage.

In some embodiments of the present application, t2$\leq$t1, optionally, t2<t1. As a result, it is beneficial for the lithium nickel manganese-containing composite oxide to have higher degree of roundness and sphericity of the grain shape, so that it is more resistant to strong acid corrosion in the electrolytic solution and stress corrosion at high voltage, and avoids the re-crystallization of large grains in the intermediate products obtained after the first sintering.

In some embodiments of the present application, 2 h$\leq$t1$\leq$50 h.

In some embodiments of the present application, 0.5 h$\leq$t2$\leq$20 h.

In some embodiments of the present application, 10 h$\leq$t1+t2$\leq$40 h.

In some embodiments of the present application, the method further comprises a step S4: annealing the product obtained in S3 to obtain a lithium nickel manganese-containing composite oxide, thereby further reducing the oxygen deficit. Optionally, the annealing temperature is 500° C. to 800° C. Optionally, the annealing time is 5 h-50 h.

In some embodiments of the present application, the method further comprises steps: after mixing the lithium nickel manganese-containing composite oxide obtained in S4 with a cladding agent, sintering under a protective gas atmosphere to obtain a lithium nickel manganese-containing composite oxide with cladding layer. Optionally, the cladding agent is a precursor compound for forming one or more of a conductive carbon material, a metal oxide, a metal fluoride, and a polyanionic material.

In some embodiments of the present application, the method further comprises steps: after mixing the lithium nickel manganese-containing composite oxide obtained in S3 with a cladding agent, sintering under a protective gas atmosphere to obtain a lithium nickel manganese-containing composite oxide with cladding layer. Optionally, the cladding agent is a precursor compound for forming one or more of a conductive carbon material, a metal oxide, a metal fluoride, and a polyanionic material.

A third aspect of the present application provides a positive electrode plate comprising a positive electrode current collector and a positive electrode film layer provided on at least one surface of the positive electrode current collector, wherein the positive electrode film layer comprises the lithium nickel manganese-containing composite oxide of the first aspect of the present application or the lithium nickel manganese-containing composite oxide prepared by the preparation method of the second aspect of the present application, and the lithium nickel manganese-containing composite oxide is present in the positive electrode film layer in a content of 1 wt % to 99 wt %, optionally 85 wt % to 99 wt %, based on total weight of the positive electrode film layer.

A fourth aspect of the present application provides a secondary battery comprising a positive electrode plate of the third aspect of the present application.

A fifth aspect of the present application provides an electrical device comprising the secondary battery of the fourth aspect of the present application.

The lithium nickel manganese-containing composite oxide provided in the present application may achieve the maximum reduction of a corrosion of an electrolytic solution, so that the lithium nickel manganese-containing composite oxide provided in the present application may have good entire performance, and the secondary battery may have improved capacity exertion, energy density and cycling life. The electrical device of the present application comprises a secondary battery provided in the present application and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

FIG. 1 is a schematic diagram of a secondary battery according to an embodiment of the present application.

FIG. 2 is an exploded view of an embodiment of the secondary battery of FIG. 1.

FIG. 3 is a schematic diagram of a battery module according to an embodiment of the present application.

Figure 4:
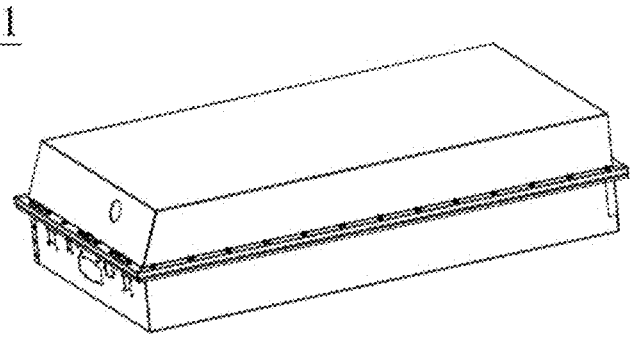
FIG. 4 is a schematic diagram of a battery pack according to an embodiment of the present application.

In the drawings, the accompanying drawings are not necessarily drawn to an actual scale. Among them, the reference sings in the drawings are illustrated as follows: 1—battery pack, 2—upper case body, 3—lower case body, 4—battery module, 5—secondary battery, 51—housing, 52—electrode assembly, and 53—cover plate.

DETAILED DESCRIPTION

Hereinafter, embodiments of the lithium nickel manganese-containing composite oxide, the method for the preparation thereof, the positive electrode plate, the secondary battery, and the electrical device containing the same will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b)

and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprise", "comprising", "contain" and "containing" mentioned in the present application mean that it is drafted in an open mode, or it may also mean a close mode. For example, the transition phases "comprise", "comprising", "contain" and "containing" may mean that other components not listed may also be included or contained, or only the listed components may be included or contained.

In the present application herein, unless otherwise stated, the term "or" is inclusive. For example, the phrase "A or B" means "A, B, or both A and B". More specifically, any of the following conditions meets "A or B": A is true (or present) and B is false (or absent); A is false (or absent) and B is true (or present); or both A and B are true (or present).

In the present application herein, the term "more" means two or more.

Spinel type $LiMn_2O_4$ is a positive electrode active material with three-dimensional lithium ion transport channels, having advantages of low price and good safety performance, but it has a low working voltage (about 4.0V), so as to result in the poor capacity exertion of secondary batteries. There is also a serious Jahn-Teller effect in the process of charge and discharge of spinel type $LiMn_2O_4$, which leads to the crystal structure transition of the positive electrode active material from cubic structure to tetrahedral structure, so that the secondary battery has a rapidly decaying capacity and poor cycle stability. In contrast, in spinel type $LiNi_{0.5}Mn_{1.5}O_4$, the manganese ion has a valence of +4 in principle, which makes it less affected by lattice distortion than $LiMn_2O_4$, so during the de-intercalation and intercalation of $Li^+$, there is almost no redox of $Mn^{3+}/Mn^{4+}$, but redox of $Ni^{2+}/Ni^{4+}$ and $Ni^{2+}/Ni^{3+}$, and thus there is almost no Jahn-Teller effect and thus no crystal structure transition. As a result, spinel type $LiNi_{0.5}Mn_{1.5}O_4$ has a voltage platform of 4.7V, and a significantly improved energy density.

However, due to the high operating voltage of spinel type $LiNi_{0.5}Mn_{1.5}O_4$ and the catalysis of transition metal ions, it is easy to oxidize and decompose organic solvents in the electrolytic solution and form a layer of carbonized film on the surface of the positive electrode active material, thereby resulting in the thickening of an interface between a positive electrode and an electrolytic solution and the increase of the impedance of the interface, and also hindering the de-intercalation and intercalation of $Li^+$. At the same time, the high working voltage of spinel type $LiNi_{0.5}Mn_{1.5}O_4$ also leads to a strong acidity of the electrolytic solution, thereby producing a large number of strong acids including HF, seriously corroding the surface of the positive electrode active material, leading to the leaching out of a large number of transition metal ions (especially manganese ions), which will seriously deteriorate the electrochemical performance of the secondary battery.

In addition, the currently prepared spinel type $LiNi_{0.5}Mn_{1.5}O_4$ is mostly octahedral or truncated octahedral in grain shape. Due to the sharp edges on its surface, these edges are prone to stress corrosion, which will further deteriorate the entire performance of the secondary battery.

In view of the above problems, the inventors of the present application have provided, after extensive research, a lithium nickel manganese-containing composite oxide with a rounded spherical or spherical-like grain shape.

Lithium Nickel Manganese-Containing Composite Oxide

A first aspect of embodiments of the present application provides a lithium nickel manganese-containing composite oxide, wherein the lithium nickel manganese-containing composite oxide is a particle with a monocrystal morphology or a quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2 \leq x \leq 0.5$, $-0.2 \leq y \leq 0.2$, $0 \leq z \leq 0.2$, $0 < a \leq 0.2$, $0 \leq k \leq 0.2$, A comprises one or more selected from Si, P and S, M comprises one or more selected from a metal-doping element.

The lithium nickel manganese-containing composite oxide provided in this application has a rounded spherical or spherical-like grain shape. "Rounded" means that in the microscopic view, in the micrometer level field of view, the surface of the grain has no sharp edges or vertices directly intersecting planes, and the flat sides of the surface are connected by curved surfaces, or the whole surface is curved. As a result, when the grain shape of lithium nickel manganese-containing composite oxide is rounded spherical or spherical-like, the rate of stress corrosion at high voltage can be significantly reduced, and the entire performance of the secondary battery can be improved.

The inventors of the present application were surprised to find, after a large number of experiments, that the above-mentioned doping element A may promote the degree of roundness of grain shape of lithium nickel manganese-containing composite oxide to make its grain shape become rounded spherical or spherical-like, and also help to obtain a particle with a monocrystal morphology or a quasi-monocrystal morphology, so that the rate of stress corrosion of the lithium nickel manganese-containing composite oxide at high voltage can be significantly reduced, and the electrochemical performance of the secondary battery can be improved.

The inventors of the present application further found, after a large number of experiments, that above-mentioned doping clement A may also be applied to systems with a high voltage of above 4.5V, may capture strong acids such as HF in the electrolytic solution, and form on the surface of the lithium nickel manganese-containing composite oxide a composite oxide containing elements such as Li, A, O, F, which composite oxide can further reduce the corrosive effect of the strong acids in the electrolytic solution, thereby reducing the leaching-out of manganese ions.

Accordingly, the lithium nickel manganese-containing composite oxide provided in the present application may achieve the maximum reductions of a corrosion of an electrolytic solution, a side reaction at the interface between a positive electrode and an electrolytic solution, and an impedance of the interface between a positive electrode and an electrolytic solution, so that the lithium nickel manganese-containing composite oxide provided in the present application may have good entire performance such as higher specific capacity and cycling stability, and the secondary battery may have improved capacity exertion, energy density and cycling life.

In the present application, "grain" and "particle" are two completely different concepts. A grain is a region of a crystalline material that is completely ordered internally, has a regular arrangement of atoms at the boundaries (grain boundaries), and undergoes an entire change. A particle in the present application refers to an agglomerate that cannot be re-dispersed by ultrasonic dispersion or the like, and which may be composed of an aggregate of one or more grains. When the particle is composed of one grain, the particle is monocrystal; and when the particle is composed of an aggregate of a plurality of grains, the particle is polycrystalline.

In the present application, the term "quasi-monocrystal" refers to a particle composed of an aggregate of a few or a dozen grains.

The lithium nickel manganese-containing composite oxide provided herein is a particle with a monocrystal morphology or a quasi-monocrystal morphology, optionally a particle with a monocrystal morphology. A polycrystalline particle has a large number of grain boundaries, which are prone to cracking under stress during the preparation and use of the secondary battery, exposing unstable surfaces and reducing the degree of roundness of the grains. The particle with a monocrystal morphology does not contain grain boundaries, and the particle with a quasi-monocrystal morphology is composed of an aggregate of several or a dozen of grains, with very a few grain boundaries inside the particle. Therefore, during the preparation and use of the secondary battery, the probability of exposure of the unstable surface in the lithium nickel manganese-containing composite oxide provided in the present application is smaller, whereby the degree of roundness of the grain is better maintained, and thus the lithium nickel manganese-containing composite oxide provided herein can has high resistance to corrosion of the electrolytic solution, resulting in better capacity exertion, higher energy density, and longer cycle life of the secondary battery.

The present application provides the lithium nickel manganese-containing composite oxide having a rounded spherical or spherical-like grain shape. In the present application, the term "spherical-like" refers to a shape that is substantially spherical or has a ratio of long diameter to short diameter close to 1, such as no greater than 1.3, optionally no greater than 1.2.

In some embodiments, a ratio of long diameter L to short diameter S of the lithium nickel manganese-containing composite oxide grain satisfies $1.0 \leq L/S \leq 1.25$, optionally, $1.0 \leq L/S \leq 1.15$. The lithium nickel manganese-containing composite oxide of the present application has a rounded spherical or spherical-like grain shape, which has a higher degree of roundness and sphericity, and thereby having a smaller rate of stress corrosion.

In some embodiments, $0.01 \leq a \leq 0.2$, optionally $0.01 \leq a \leq 0.1$. If the doping element A is present in a content within a suitable range, it is favorable for the secondary battery to have good dynamic performance and long service life.

In some embodiments, M is a transition metal element, optionally including one or more selected from Ti, Cr, Mo, Nb, Ru, Te, Ta, W, Ce, Y, and Yb. The above-mentioned doping clement M may promote the degree of roundness of grain shape of lithium nickel manganese-containing composite oxide, make its grain shape become rounded spherical or spherical-like, and also help to obtain a particle with a monocrystal morphology or a quasi-monocrystal morphology, so that the rate of stress corrosion of the lithium nickel manganese-containing composite oxide at high voltage can be significantly reduced, and the electrochemical performance of the secondary battery can be improved.

In some embodiments, M comprises one or more selected from Mo, Nb, Ru, Te, Ta, Ce, and Yb, optionally, M comprises two or more selected from Mo, Nb, Ru, Te, Ta, Ce, and Yb. Optionally, M comprises two and more selected from Nb, Te, Ta, and Ce. For example, M is a combination of Te and Ta, a combination of Nb and Te, a combination of Nb and Ce, and the like. In addition to promoting the degree of roundness of grain shape of lithium nickel manganese-containing composite oxide, these doping elements M may also form strong bonds with oxygen, and therefore, it may enhance the structural stability and reduce oxygen defects of lithium nickel manganese-containing composite oxide, and further enable the lithium nickel manganese-containing composite oxide and secondary battery to have better electrochemical performance.

In some embodiments, z is 0.

In some embodiments, $0 < z \leq 0.2$, optionally, $0.005 \leq z \leq 0.1$, $0.005 \leq z \leq 0.09$, $0.005 \leq z \leq 0.08$, $0.005 \leq z \leq 0.07$, $0.005 \leq z \leq 0.06$, and $0.005 \leq z \leq 0.05$. If the doping element M is present in a content within a suitable range, it is favorable for the secondary battery to have good dynamic performance and long service life.

In some embodiments, $0.01 \leq z+a \leq 0.2$, optionally, $0.01 \leq z+a \leq 0.175$, $0.01 \leq z+a \leq 0.15$, $0.01 \leq z+a \leq 0.125$, and $0.01 \leq z+a \leq 0.1$. If the total amount of the doping element A and the doping clement M are in a suitable range, it is favorable for the lithium nickel manganese-containing composite oxide and the secondary battery to have better electrochemical performance. The following can be effectively avoided: if the total amount of the doping element A and the doping element M is too high, it may significantly reduce the specific capacity of the lithium nickel manganese-containing composite oxide and reduce the energy density of the secondary battery.

In some embodiments, $0 < z \leq 0.2$ and $1 \leq a/z \leq 5$, optionally $0 < z \leq 0.2$ and $2 \leq a/z \leq 4$. The doping element A is more suitable for systems with a high voltage of above 4.5V, which may capture strong acids in the electrolytic solution, reduce the corrosive effect of the strong acid in the electrolytic solution, and reduce the leaching out of manganese ions; the doping clement M helps to enhance the structural stability of lithium nickel manganese-containing composite oxide. Therefore, if the ratio of the doping element A to the doping element M is in the suitable range, the maximum reduction of corrosion of an electrolytic solution may be achieved, enabling the lithium nickel manganese-containing composite oxide and secondary battery to have better electrochemical performance.

In some embodiments, the lithium nickel manganese-containing composite oxide has a 4V plateau charging capacity ratio R satisfying $0 < R \leq 0.125$, optionally, $0.03 \leq R \leq 0.115$, $0.03 \leq R \leq 0.105$, $0.03 \leq R \leq 0.95$, and $0.03 \leq R \leq 0.85$.

The 4V plateau charging capacity ratio R of the lithium nickel manganese-containing composite oxide is measured as follows: assembling a button battery with a electrode plate comprising the lithium nickel manganese-containing composite oxide as a positive electrode and a lithium plate as a negative electrode, charging the battery to 4.95V at a current of 0.1 C, and then charging to a current of 0.05 C at the constant voltage, using a ratio of the charging capacity in the range of 3.5V to 4.4V to the total charging capacity of the button battery as the 4V plateau charging capacity ratio R of the lithium nickel manganese-containing composite oxide.

The lithium nickel manganese-containing composite oxide provided in the present application may be applied to systems with a high voltage of above 4.5V, and its charging capacity is lower at low voltage (e.g., 3.5V-4.4V) and higher at high voltage, so it can give full play to its advantages of large capacity at high voltage, and make the secondary battery to have high energy density.

In some embodiments, the lithium nickel manganese-containing composite oxide has a volume particle size Dv50 satisfying 3 $\mu m \leq Dv50 \leq 16$ $\mu m$, optionally, 5 $\mu m \leq Dv50 \leq 13$ $\mu m$. If the lithium nickel manganese-containing composite oxide has a volume particle size Dv50 within a suitable range, it may have good ionic transport capability as well as high compaction density, and thus is favorable for the secondary battery to have good dynamic performance and long service life.

In some embodiments, the lithium nickel manganese-containing composite oxide has a BET specific surface area S0 of $\leq 0.8$ $m^2/g$, optionally, 0.1 $m^2/g \leq S0 \leq 0.5$ $m^2/g$. If the lithium nickel manganese-containing composite oxide has the BET specific surface area within a suitable range, it may reduce the side reaction of electrolytic solution on its surface and reduce the leaching out of manganese ions, and thus is favorable for the secondary battery to have good dynamic performance and long service life.

In some embodiments, the lithium nickel manganese-containing composite oxide has a tap density TD satisfying 1.5 $g/cm^3 \leq TD \leq 3.0$ $g/cm^3$, optionally, 1.7 $g/cm^3 \leq TD \leq 2.3$ $g/cm^3$. If the lithium nickel manganese-containing composite oxide has a tap density TD within a suitable range, it is favorable for the secondary battery to have a higher energy density.

In some embodiments, the lithium nickel manganese-containing composite oxide further has a cladding layer on the surface. It may further improve the structural stability of the lithium nickel manganese-containing composite oxide, reduce the direct contact between the lithium nickel manganese-containing composite oxide and the electrolytic solution, and reduce the leaching out of manganese ions, so as to be favorable for the secondary battery to have a longer service life.

In some embodiments, the cladding layer comprises one or more selected from a conductive carbon material, a metal oxides, a metal fluoride and a polyanionic material. Optionally, the conductive carbon material comprises one or more selected from soft carbon, hard carbon, graphene and graphene oxide. Optionally, the metal oxide comprises one or more selected from $Al_2O_3$, $B_2O_3$, $TiO_2$, $ZrO_2$, $WO_3$, $MoO_3$, $Y_2O_3$, $Ta_2O_5$, $TeO_2$, and $Nb_2O_5$. Optionally, the metal fluoride comprises one or more selected from $LiF$, $AlF_3$, and $GaF_3$. Optionally, the polyanionic material comprises one or more selected from orthophosphates and fluoro-orthophosphates containing at least one element of Li, Ni, Co, Mn, Fe, Nb, Mo, W, Ta and Te, more optionally one or more of $LiNiPO_4$, $LiPO_2F_2$ and $Li_2PO_3F$.

Preparation Method

A second aspect of embodiments of the present application provides a preparation method of a lithium nickel manganese-containing composite oxide, which may prepare the lithium nickel manganese-containing composite oxide according to the first aspect of embodiments of the present application.

The preparation method comprises the following steps: S1: providing a raw material obtained by mixing a source of element Li, a source of element Ni, a source of element Mn, a source of element A, and an optional source of element M in a predetermined proportion; S2: heating the raw material obtained in S1 to a first temperature T1 under an oxygen-containing atmosphere, maintaining at the first temperature T1 for a first time t1, cooling to room temperature, after which a intermediate product is obtained, 850° $C. \leq T1 \leq 1100°$ C.; and S3: heating the intermediate product obtained in S2 to a second temperature T2 under an oxygen-containing atmosphere, maintaining at the second temperature T2 for a second time t2, after which a lithium nickel manganese-containing composite oxide is obtained, 0° $C. \leq T1 - T2 \leq 200°$ C., and $T2 \geq 800°$ C., wherein the lithium nickel manganese-containing composite oxide is a particle with a monocrystal morphology or quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2 \leq x \leq 0.5$, $-0.2 \leq y \leq 0.2$, $0 \leq z \leq 0.2$, $0 < a \leq 0.2$, $0 \leq k \leq 0.2$, A comprises one or more selected from Si, P and S, M comprises one or more selected from a metal-doping element, optionally one or more selected from Ti, Cr, Mo, Nb, Ru, Te, Ta, W, Ce, Y and Yb.

In the preparation of lithium nickel manganese-containing composite oxide, at least two discontinuous sintering processes are used. The discontinuous sintering process means that a cooling treatment needs to be carried out after the previous sintering process is completed, and then the temperature is raised for the next sintering process.

In the preparation method of the present application, the first temperature T1 during the first sintering satisfies 850° $C. \leq T1 \leq 1100°$ C., thus ensuring that the grain grows to the target size and the grain structure is complete.

In some embodiments, optionally, 900° $C. \leq T1 \leq 1100°$ C., 950° $C. \leq T1 \leq 1100°$ C. As a result, it is beneficial for the lithium nickel manganese-containing composite oxide grain to grow to the target size, and have a suitable particle size and specific surface area, and is beneficial for the lithium nickel manganese-containing composite oxide to have an intact grain structure, so that the secondary battery may have better cycling performance.

In the preparation method of the present application, the second temperature T2 during the second sintering satisfies 0° $C. \leq T1 - T2 \leq 200°$ C., and $T2 \geq 800°$ C.

By controlling the temperature T2 during the second sintering to be less than or equal to the temperature T1 during the first sintering, it promotes the micro-powders in the intermediate products obtained after the first sintering to recrystallize while avoiding the recrystallization of large grains, thus ensuring that the grain of the lithium nickel manganese-containing composite oxide to be rounded spherical or spherical-like shape. If the temperature T2 during the second sintering is greater than the temperature T1 during the first sintering, the large grains in the intermediate products obtained after the first sintering will also recrystallize, so that the sphericity of the obtained lithium nickel manganese-containing composite oxide grain is worse, and it is not conducive to the control of its particle size and specific surface area.

If T1−T2 is greater than 200° C. or T2 is less than 800° C., the temperature T2 during the second sintering is too low, and thus the obtained lithium nickel manganese-containing composite oxide is octahedral (or truncated octahedral) or rounded octahedral (or truncated octahedral) in grain shape, has high stress corrosion at high voltage, and high amount of leaching out of manganese ion, thereby shortening the service life of the secondary battery.

In some embodiments, 0° $C. \leq T1 - T2 \leq 100°$ C., optionally 0° $C. < T1 - T2 \leq 100°$ C. As a result, it is beneficial for the lithium nickel manganese-containing composite oxide to have higher degree of roundness and sphericity of the grain shape, so that it is more resistant to strong acid corrosion in the electrolytic solution and stress corrosion at high voltage.

In some embodiments, optionally, 850° C.≤T2≤1000° C. As a result, it is beneficial for the lithium nickel manganese-containing composite oxide to have higher degree of roundness and sphericity of the grain shape, so that it is more resistant to strong acid corrosion in the electrolytic solution and stress corrosion at high voltage.

In some embodiments, 0° C.≤T1−T2≤100° C., and 850° C.≤T2≤1000° C., optionally 0° C.<T1−T2≤100° C., and 850° C.≤T2≤1000° C.

In some embodiments, the heating rates in S2 and S3 are independently 1° C./min to 10° C./min, optionally 1° C./min to 5° C./min.

In some embodiments, the first time t1 and the second time t2 satisfy t2≤t1, optionally, t2<t1. As a result, it is beneficial for the lithium nickel manganese-containing composite oxide to have higher degree of roundness and sphericity of the grain shape, so that it is more resistant to strong acid corrosion in the electrolytic solution and stress corrosion at high voltage, and avoids the re-crystallization of large grains in the intermediate products obtained after the first sintering.

In some embodiments, 2 h≤t1≤50 h.

In some embodiments, 0.5 h≤t2≤20 h.

In some embodiments, 10 h≤t1 +t2≤40 h.

In the preparation method of the present application, the sintering atmosphere in S2 and S3 is an oxygen-containing atmosphere. In some embodiments, the partial pressure of oxygen in an oxygen-containing atmosphere may be from 20% to 100%, and the oxygen-containing atmosphere may also contain inert gases, such as one or more of nitrogen, helium, and argon.

In some embodiments, optionally, the oxygen-containing atmosphere in S2 and S3 is an air atmosphere. This helps to reduce production costs.

In the preparation methods of the present application, the sintering pressure in S2 and S3 is a slightly positive pressure, for example, a positive pressure of 0.03±0.03 MPa relative to atmospheric pressure.

In the preparation methods of the present application, the source of each element may be a compound known in the art that can be used to prepare lithium nickel manganese-containing composite oxide. For example, the source of element Li may include one selected from lithium carbonate, lithium hydroxide, lithium phosphate, lithium dihydrogen phosphate, or a combination thereof, the source of element Ni may include one selected from elemental nickel, nickel oxide, nickel phosphate, nickel oxalate, nickel carbonate, and nickel sulfate, or a combination thereof, the source of element Mn may include one selected from elemental manganese, manganese oxide, manganese phosphate, manganese oxalate, manganese carbonate, and manganese sulfate, or a combination thereof, and the source of element A may include one selected from element A as a monomer, oxide, oxide, manganese-containing compound. combinations, the source of element A may comprise one selected from elemental substance, oxides, silicates, phosphates, and sulfates of element A, or combinations thereof, and the source of element M may include one selected from elemental substance, oxides, phosphates, oxalates, carbonates, and sulfates of element M, or a combination thereof.

In the preparation method of the present application, the source of each element is added in an amount consistent with the stoichiometric ratio. In some embodiments, the added amount of the source of the element Li may be slightly excessive, for example, it may be 100% to 110% of the theoretical weight. The theoretical weight refers to the weight of the source of the element Li calculated according to the stoichiometric ratio of lithium nickel manganese-containing composite oxide.

In some embodiments, the method further comprises a step S4: annealing the product obtained in S3 to obtain a lithium nickel manganese-containing composite oxide, thereby further reducing the oxygen deficit. Optionally, the annealing temperature is 500° C. to 800° C. Optionally, the annealing time is 5 h-50 h.

In some embodiments, the method further comprises steps: after mixing the lithium nickel manganese-containing composite oxide obtained in S3 with a cladding agent, sintering under a protective gas atmosphere to obtain a lithium nickel manganese-containing composite oxide with cladding layer. Optionally, the cladding agent is a precursor compound for forming one or more of a conductive carbon material, a metal oxide, a metal fluoride, and a polyanionic material.

In some embodiments, the method further comprises steps: after mixing the lithium nickel manganese-containing composite oxide obtained in S4 with a cladding agent, sintering under a protective gas atmosphere to obtain a lithium nickel manganese-containing composite oxide with cladding layer. Optionally, the cladding agent is a precursor compound for forming one or more of a conductive carbon material, a metal oxide, a metal fluoride, and a polyanionic material.

In the present application, the protective gas may be nitrogen, helium, argon, or a combination thereof.

In the preparation of the lithium nickel manganese-containing composite oxide in the second aspect of the present application, some of the involved parameters of the lithium nickel manganese-containing composite oxide (such as the type of doping clement and its content) may be referred to the lithium nickel manganese-containing composite oxide in the first aspect of the present application, and will not be repeated here.

Unless otherwise stated, each of the raw materials used in the preparation method of the second aspect of the present application may be commercially available.

Positive Electrode Plate

A third aspect of the embodiments of the present application provides a positive electrode plate comprising a positive electrode current collector and a positive electrode film layer provided on at least one surface of the positive electrode current collector, wherein the positive electrode film layer comprises the lithium nickel manganese-containing composite oxide of the first aspect of the present application or the lithium nickel manganese-containing composite oxide prepared by the preparation method of the second aspect of the present application, and the lithium nickel manganese-containing composite oxide is present in the positive electrode film layer in a content of 1 wt % to 99 wt %, optionally 85 wt % to 99 wt %, based on the total weight of the positive electrode film layer. The positive electrode current collector has two surfaces opposite to each other in the direction of its own thickness, and the positive electrode film layer is provided on either or both of two opposite surfaces of the positive electrode current collector.

The positive electrode film layer may also comprise other positive electrode active materials for secondary batteries, known in the art. By way of example, the other positive electrode active material may include one or more of lithium transition metal oxides, lithium-containing phosphates with an olivine structure, and modified compounds thereof. Examples of lithium transition metal oxides may include one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of lithium-containing phosphates with an olivine structure may include one or more of lithium iron phosphate, lithium iron phosphate composite with carbon, lithium manganese phosphate, lithium manganese phosphate composite with carbon, lithium manganese iron phosphate, lithium manganese iron phosphate composite with carbon, and modified compounds thereof. In the present application, the modified compound of each of the above positive electrode active materials may be a doping modification and/or a surface cladding modification of the positive electrode active material.

In some embodiments, the positive electrode film layer may further optionally comprise a positive conductive agent. In the present application, the type of the positive conductive agent is not particularly limited. As an example, the positive conductive agent comprises one or more of superconducting carbon, conductive graphite, acetylene black, carbon black, Ketjen black, carbon dots, carbon nanotubes, graphene, and carbon nanofibers.

In some embodiments, the positive electrode film layer may further optionally comprise a positive electrode binder. In the present application, the type of the positive electrode binder is not particularly limited. As an example, the positive electrode binder may comprise one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments, the positive electrode current collector may be a metal foil or a composite current collector. As an example of a metal foil, an aluminum foil may be used. The composite current collector may comprise a polymer base layer and a metallic material layer formed on at least one surface of the polymer base layer. As an example, the metallic material may comprise one or more of aluminum, aluminum alloy, nickel, nickel alloy, titanium, titanium alloy, silver, and silver alloy. As an example, the polymer base layer may comprise one or more of polypropylene (PP), polyethylene terephthalate (PET), polybutylene terephthalate (PBT), polystyrene (PS), polyethylene (PE), etc.

The positive electrode film layer is usually made by applying a positive electrode slurry to the positive electrode current collector followed by drying and cold pressing. The positive electrode slurry is usually formed by dispersing the positive electrode active material, an optional conductive agent, an optional binder, and any other components in a solvent and stirring uniformly. The solvent may be N-methylpyrrolidone (NMP), but is not limited thereto.

Secondary Battery

A fourth aspect of embodiments of the present application provides a secondary battery comprising the positive electrode plate of the third aspect of the present application. A secondary battery, also known as a rechargeable battery or accumulator, is a battery that can continue to be used by activating its active material by means of charging after the battery has been discharged. Typically, a secondary battery includes an electrode assembly and an electrolyte, and the electrode assembly includes a positive electrode plate, a negative electrode plate, and a separator. During the charging and discharging process of the battery, lithium ions are de-intercalated and intercalated back and forth between the positive electrode plate and the negative electrode plate. The separator is disposed between the positive electrode plate and the negative electrode plate, which mainly functions as preventing short circuit of the positive and negative electrodes and at the same time allowing lithium ions to pass through. The electrolyte functions as conducting lithium ions between the positive electrode plate and the negative electrode plate.

[Positive Electrode Plate]

A positive electrode plate used in the secondary battery of this application is the positive electrode plate described in any one of embodiments of the third aspect of this application.

[Negative Electrode Plate]

In some embodiments, the negative electrode plate comprises a negative electrode current collector and a negative electrode film layer provided on at least one surface of the negative electrode current collector and comprising a negative electrode active material. For example, the negative electrode current collector has two surfaces opposite to each other in the direction of its own thickness, and the negative electrode film layer is provided on either or both of two opposite surfaces of the negative electrode current collector.

The negative electrode active material may be a negative electrode active material known in the art for use in the secondary battery. By way of example, the negative electrode active material includes, but is not limited to, one or more of natural graphite, artificial graphite, soft carbon, hard carbon, silicon-based material, tin-based material, and lithium titanate. The silicon-based material may include one or more of elemental silicon, a silicon oxide, a silicon carbon composite, a silicon nitrogen composite, a silicon alloy material. The tin-based materials may include one or more of elemental tin, a tin oxide, and a tin alloy material. The present application is not limited to these materials, and other conventionally known materials that can be used as negative electrode active materials for the secondary battery may also be used. These negative electrode active materials can be used alone, or in combination of two or more materials.

In some embodiments, the negative electrode film layer may also optionally comprise a negative electrode conductive agent. In the present application, the type of the negative electrode conductive agent is not particularly limited and, as an example, the negative electrode conductive agent may include one or more of superconducting carbon, conductive graphite, acetylene black, carbon black, Ketjen black, carbon dots, carbon nanotubes, graphene, and carbon nanofibers.

In some embodiments, the negative electrode film layer may further optionally comprise a negative electrode binder. In the present application, the type of the negative electrode binder is not particularly limited and, as an example, the negative electrode binder may include one or more of styrene-butadiene rubber (SBR), water-soluble unsaturated resin SR-1B, aqueous acrylic resins (e.g., polyacrylic acid PAA, polymethacrylic acid PMAA, polyacrylic acid sodium salt PAAS), polyacrylamide (PAM), polyvinyl alcohol (PVA), sodium alginate (SA), and carboxymethyl chitosan (CMCS).

In some embodiments, the negative electrode film layer may optionally also include other additives. As an example, the other additives may include thickeners, e.g., sodium carboxymethyl cellulose (CMC-Na), and PTC thermistor material, etc.

In some embodiments, the negative electrode current collector may be a metal foil or a composite current collector. As an example of a metal foil, a copper foil may be used. The composite current collector may include a polymeric material base layer and a metallic material layer formed on at least one surface of the polymeric material base layer. As an example, the metallic material may include one or more of copper, copper alloy, nickel, nickel alloy, titanium, titanium alloy, silver, and silver alloy. As an example, the polymer material base layer may include one or more of polypropylene (PP), polyethylene terephthalate (PET), polybutylene terephthalate (PBT), polystyrene (PS), polyethylene (PE), etc.

The negative electrode film layer is usually made by applying a negative electrode slurry to the negative electrode current collector followed by drying and cold pressing. The negative electrode slurry is usually formed by dispersing the negative active material, an optional conductive agent, an optional binder, and any other optional additives in a solvent and stirring uniformly. The solvent may be N-methylpyrrolidone (NMP) or deionized water, but is not limited thereto.

The negative electrode plate does not exclude other additional functional layers than the negative electrode film layer. For example, in some embodiments, the negative electrode plate described in the present application further comprises a conductive primer (e.g. being composed of a conductive agent and a binder) sandwiched between the negative electrode current collector and the negative electrode film layer and disposed on the surface of the negative electrode current collector. In some other embodiments, the negative electrode plate described in this application further comprises a protective layer cladding the surface of the negative electrode film layer.

[Electrolyte]

The type of electrolyte is not specifically restricted in the present application, and can be selected by those skilled in the art according to actual requirements. For example, the electrolyte may include at least one selected from a solid electrolyte and a liquid electrolyte (i.e., an electrolytic solution).

In some embodiments, an electrolytic solution is used as the electrolyte. The electrolytic solution includes an electrolyte salt and a solvent.

The type of electrolyte salt is not specifically restricted in the present application, and can be selected by those skilled in the art according to actual requirements. In some embodiments, as an example, the electrolyte salt may comprise one or more of lithium hexafluorophosphate (LiPF6), lithium tetrafluoroborate (LiBF4), lithium perchlorate (LiClO4), lithium hexafluoroarsenate (LiAsF6), lithium bisfluorosulfonimide (LiFSI), lithium bis(trifluoromethane sulfonimide) (LiTFSI), lithium trifluoromethane sulfonate (LiTFS), lithium difluorooxalate borate (LiDFOB), lithium dioxalate borate (LiBOB), lithium difluorophosphate (LiPO2F2), lithium difluorodioxalate phosphate (LiDFOP) and lithium tetrafluorooxalate phosphate (LiTFOP).

The type of solvent is not specifically restricted in the present application, and can be selected by those skilled in the art according to actual requirements. In some embodiments, the solvent may comprise one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolytic solution may also optionally include additives. For example, the additives may include negative electrode film-forming additives, and may include positive electrode film-forming additives, and yet may include additives that can improve certain performances of battery, for example, additives that improve battery overcharge performance, additives that improve high-temperature performance of a battery, and additives that improve low-temperature performance of a battery.

[Separator]

In the secondary battery using an electrolytic solution and some secondary battery using a solid electrolyte, a separator may be further included. The separator is arranged between the positive electrode plate and the negative electrode plate, and mainly functions to prevent short circuit of the positive and negative electrodes while allowing lithium ions to pass through. There is no particular limitation on the type of separator in the present application, and any well-known porous-structure separator with good chemical stability and mechanical stability may be used.

In some embodiments, materials of the separator may be one or more of glass fibers, non-woven fabrics, polyethylene, polypropylene and polyvinylidene fluoride. The separator may be a single-layer film or a multi-layer composite film. When the separator is a multi-layer composite film, materials of each layer may be the same or different.

In some embodiments, the positive electrode plate, the separator, and the negative electrode plate may be made into an electrode assembly by a winding process or a stacking process.

In some embodiments, the secondary battery may include an outer package. The outer package may be used to encapsulate the electrode assembly and electrolyte.

In some embodiments, the outer package of the secondary battery may be a hard case, such as a hard plastic case, an aluminum case, a steel case, and the like. The outer package of the secondary battery may also be a soft package, such as a pouch-type soft package. The material of the soft bag can be plastic, such as at least one of polypropylene (PP), polybutylene terephthalate (PBT), and polybutylene succinate (PBS).

The present application does not have particular limitation to the shape of the secondary battery. The secondary battery may be cylindrical, cuboid, or in other arbitrary shape. FIG. 1 shows a secondary battery 5 with a cuboid structure as an example.

In some embodiments, as shown in FIG. 2, the outer package may include a housing 51 and a cover plate 53. The housing 51 may include a bottom plate and side plates connected to the bottom plate, and the bottom plate and the side plates enclose a receiving cavity. The housing 51 has an opening communicated with the receiving cavity, and the cover plate 53 can cover the opening to close the receiving cavity. The positive electrode plate, the negative electrode plate and the separator may be wound or laminated to form an electrode assembly 52, which is encapsulated in the receiving cavity. A non-aqueous electrolytic solution is infiltrated into the electrode assembly 52. The number of electrode assemblies 52 contained in the secondary battery 5 may be one or more, which may be adjusted according to the demand.

The method for preparing the secondary battery of the present application is well known. In some embodiments, a positive electrode plate, a separator, a negative electrode plate, and a non-aqueous electrolytic solution may be assembled to form a secondary battery. As an example, a positive electrode plate, a separator, and a negative electrode plate can be made into an electrode assembly by a winding process or a stacking process, and the electrode assembly can be placed in an outer package and is subjected to drying, to which an electrolytic solution is injected. After vacuum encapsulation, resting, chemical formation, and shaping process, a secondary battery can be obtained.

In some embodiments of the present application, the secondary battery according to the present application can be assembled into a battery module, and the number of secondary battery contained in the battery modules can be more than one, and the specific number can be adjusted according to application and capacity of the battery module.

FIG. 3 is a schematic diagram of the battery module 4 as an example. As shown in FIG. 3, in the battery module 4, a plurality of secondary batteries 5 may be arranged in sequence along the longitudinal direction of the battery module 4. Certainly, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the application and capacity of the battery pack.

Figure 5:
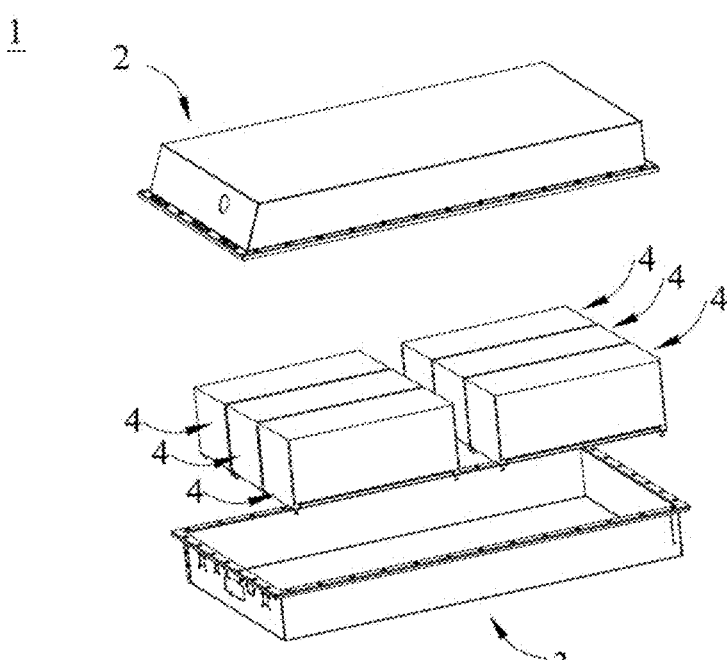
FIG. 5 is an exploded view of the battery pack according to an embodiment of the present application as shown in FIG. 4.

FIGS. 4 and 5 are schematic diagrams of the battery pack 1 as an example. As shown in FIGS. 4 and 5, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

A fifth aspect of embodiments of the present application provides an electrical device comprising at least one of the secondary battery, battery module, or battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
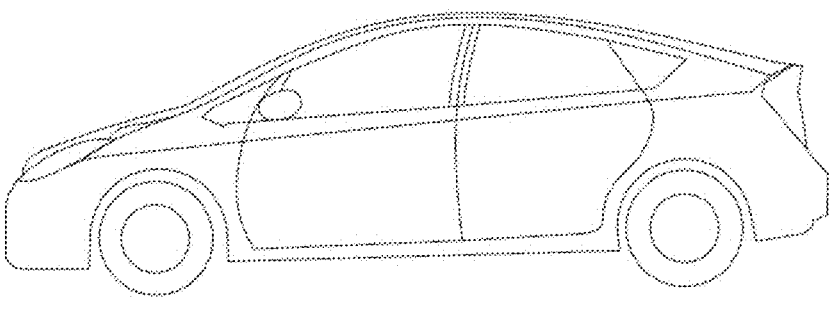
FIG. 6 is a schematic diagram of an electrical device according to an embodiment of the present application using the secondary battery of the present application as a power source.

FIG. 6 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, and all reagents used in the examples are commercially available or synthesized according to conventional methods and can be directly used without further treatment, and all instruments used in the examples are commercially available.

Example 1

(1) Preparation of Lithium Nickel Manganese-Containing Composite Oxide $Li_2CO_3$ (as a source of element Li), $Ni_{0.5}Mn_{1.35}(OH)_{3.7}$ (as a source of elements Ni, and Mn), $NH_4H_2PO_4$ (as a source of element A) and $TeO_2$ (as a source of element M) were weighed according to corresponding stoichiometric ratios of the target composition $LiNi_{0.5}Mn_{1.35}Te_{0.05}P_{0.1}O_4$ and mixed thoroughly to obtain the raw material mixture powder. The above raw material mixture powder was heated up to 950° C. (as a first temperature T1) at 5° C./min in an air atmosphere for 20 hours (as a first time t1) and then cooled to room temperature to obtain an intermediate product. The above intermediate product was heated up to 850° C. (as a second temperature T2) at 5° C./min for 10 hours (as a second time t2) in a positive pressure of 0.03±0.03 MPa relative to atmospheric pressure, and air atmosphere to obtain a lithium nickel manganese-containing composite oxide. The content of elements may be detected by inductively coupled plasma emission spectroscopy (ICP) with reference to EPA 6010D-2014.

(2) Preparation of Button Battery (Half Battery)

The prepared lithium nickel manganese-containing composite oxide (as a positive electrode active material), conductive carbon black and polyvinylidene fluoride were mixed at the weight ratio of 90:5:5, and a suitable amount of solvent NMP was added, and stirred uniformly to obtain a positive electrode slurry. The positive electrode slurry was coated on the aluminum foil of the positive electrode current collector, and the positive electrode plate was obtained after drying. The loading amount of lithium nickel manganese-containing composite oxide on the positive electrode plate was 0.015 $g/cm^2$.

Lithium plate was used as a counter electrode, 1 mol/L solution of $LiPF_6$ in ethylene carbonate (EC), diethyl carbonate (DEC) and dimethyl carbonate (DMC) at volume ratio of 1:1:1 was used as an electrolytic solution, a polypropylene film (Φ16 mm) with a thickness of 12 μm was used as a separator, and they were assembled together with the above prepared positive electrode plate in a button battery box to form a CR2030 button battery, rested for 24 hours to obtain a half battery.

(3) Preparation of Secondary Battery (Full Battery)

The prepared lithium nickel manganese-containing composite oxide (as a positive electrode active material), conductive carbon black and polyvinylidene fluoride were mixed at the weight ratio of 96:2.5:1.5, and a suitable amount of solvent NMP was added, and stirred uniformly to obtain a positive electrode slurry. The positive electrode slurry was coated on the two surfaces of the aluminum foil of the positive electrode current collector, and the positive electrode plate was obtained after drying and cold pressing. The loading amount of lithium nickel manganese-containing composite oxide on one side of the positive electrode current collector was 0.02 g/cm$^2$.

The artificial graphite as a negative electrode active material, carbon black (Super P) as a conductive agent, styrene-butadiene rubber as a binder, and sodium carboxymethyl cellulose as a thickener at a weight ratio of 96:1:1:2 were mixed under stirring thoroughly in a suitable amount of the deionized water as a solvent to form a negative electrode slurry. The negative electrode slurry was coated on the two surfaces of the copper foil of the negative electrode current collector, and the negative electrode plate was obtained after drying and cold pressing. The loading amount of negative electrode active material on one side of the negative electrode current collector was 0.008 g/cm$^2$.

A polypropylene film ($\Phi16$ mm) with a thickness of 12 $\mu$m was used as a separator, which was placed in sequence with the prepared positive electrode plate and the negative electrode plate, so that the separator was between the positive electrode plate and the negative electrode plate to play a role of isolation, and the electrode assembly is obtained after winding; the electrode assembly was placed in an outer aluminum-plastic bag, dried and injected with the same electrolytic solution as that of the prepared button battery, and after vacuum encapsulation, resting, chemical formation, and capacity grading process, a secondary battery was obtained.

Examples 2-30 and Comparative Examples 1-7

The preparations of a button battery and a secondary battery were the same as those in Example 1 with the exception that the preparation of lithium nickel manganese-containing composite oxide is different. The differences in the preparation of lithium nickel manganese-containing composite oxide were detailed in Table 1. In addition, an additional annealing treatment step was added to Example 30 with an annealing temperature of 680° C. and an annealing time of 10 hours.

Test Section (1) Test of Morphology of Lithium Nickel Manganese-Containing Composite Oxide The prepared lithium nickel manganese-containing composite oxide was tested with a scanning electron microscope, and then tested with reference to JY/T010-1996, and the sample morphology was observed. The testing instrument may be ZEISS sigma 300.

(2) Test of Ratio of Long Diameter to Short Diameter of Lithium Nickel Manganese-Containing Composite Oxide Grain The prepared lithium nickel manganese-containing composite oxide was tested with a scanning electron microscope, and the average ratio of the long diameter L of the circumscribed ellipse of the grain to the short diameter S of the inscribed ellipse of the grain was counted in any field of view from 5×Dv50 to 10×Dv50 containing at least 50 visible grains, as the ratio of long diameter/short diameter (L/S) of the lithium nickel manganese-containing composite oxide grain. The testing apparatus may be a ZEISS sigma 300.

(3) Test of Volume Particle Size Dv50 of Lithium Nickel Manganese-Containing Composite Oxide In the present application, the volume particle size Dv50 of the lithium nickel manganese-containing composite oxide has the meaning commonly known in the art, which indicates the particle size corresponding to 50% of the cumulative volume distribution of the material and can be measured by an instrument and method known in the art. For example, it may be conveniently determined using a laser particle size analyzer with reference to GB/T 19077-2016. The testing instrument may be a Mastersizer 2000E laser particle size analyzer from Malvern Instruments Ltd. in the United Kingdom.

(4) Test of BET Specific Surface Area of Lithium Nickel Manganese-Containing Composite Oxide In the present application, the BET specific surface area of lithium nickel manganese-containing composite oxide has the meaning known in the art, and can be determined by an instrument and a method known in the art. For example, it can be tested with reference to GB/T 19587-2017 using nitrogen adsorption specific surface area analysis test method and calculated by the BET method. The testing instrument may be a Tri-Star 3020 specific surface area pore size analysis tester from Micromeritics, USA.

(5) Test of Tap Density of Lithium Nickel Manganese-Containing Composite Oxide

In the present application, the tap density of lithium nickel manganese-containing composite oxide has the meaning known in the art, and can be determined by an instrument and a method known in the art. For example, it may be determined by a powder tap density tester with reference to GB/T 5162-2006. The testing instrument may be a Dandong Baxter BT-301.

(6) Test of 4V Plateau Charging Capacity Ratio of Lithium Nickel Manganese-Containing Composite Oxide The prepared button battery was charged at a constant current of 0.1 C to a voltage of 4.95 V, and then charged at a constant voltage of 4.95 V to a current of 0.05 C at 25° C. The charging capacity in the range of voltages of 3.5 V-4.4 V (denoted as C1) and the total charging capacity in the range of voltages of 3.5 V-4.95 V (with 3.5 V as the lower cut-off voltage) (denoted as C2) were extracted from the raw charging data obtained. The 4V plateau charging capacity ratio R of the lithium nickel manganese-containing composite oxide is R=C1/C2.

(7) Test of Initial Discharging Capacity of Secondary Battery

At 25° C., the prepared secondary battery was charged to a voltage of 4.9V with a constant current of 0.3 C, further charged to a current of 0.05 C at a constant voltage of 4.9V, and after a 5-minute rest, discharged to a voltage of 3.5V at a constant current of 0.33 C, at which time, the discharging capacity obtained is the initial discharging capacity of the secondary battery.

(8) Test of Cycling Performance of Secondary Battery

At 45° C., the prepared secondary battery was charged to a voltage of 4.9V with constant current of 0.3 C, and further charged to a current of 0.05C with constant voltage 4.9V, allowed for standing for 5 minutes, charged to a voltage of 3.5V with a constant current of 0.33 C. This was a cyclic charge-discharge process, at which time the discharging capacity was recorded as the discharging capacity of the first cycle. The secondary battery was subjected to the cyclic charge-discharge processes as described above until the discharging capacity decreased to 80% of the discharging capacity of the first cycle, at which time the number of cycles of the secondary battery was recorded.

As can be seen from the test results in Table 2, the grain shape of the lithium nickel manganese-containing composite oxide obtained by the preparation method of the present application is rounded spherical or spherical-like, the lithium nickel manganese-containing composite oxide particle has a monocrystal morphology or a quasi-monocrystal morphology, which can minimize a corrosion of an electrolytic solution, such as strong acid corrosion and stress corrosion at high voltage, thereby improving the capacity exertion, energy density and cycling life of the secondary battery.

Figure 7:
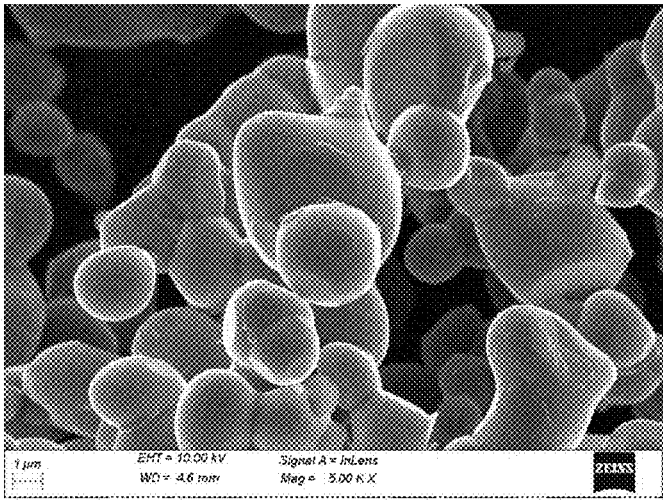
FIG. 7 is a scanning electron micrograph of the lithium nickel manganese-containing composite oxide prepared by Example 1.

From the test results of Examples 1-7 and Comparative Examples 1-5, it can be seen that in the preparation of lithium nickel manganese-containing composite oxide, two discontinuous sintering processes are used, wherein the first sintering temperature is controlled to be between 850° C. and 1100° C., optionally between 950° C. and 1100° C., the second sintering temperature is controlled to be greater than or equal to 800° C., and the difference between the first sintering temperature and the second sintering temperature is controlled to be between 0° C. and 200 C, optionally 0° C. and 100° C., so as to obtain a lithium nickel manganese-containing composite oxide having a rounded a spherical or spherical-like grain shape and a monocrystal particle morphology or a quasi-monocrystal morphology. The grain shape is shown in FIG. 7.

Figure 8:
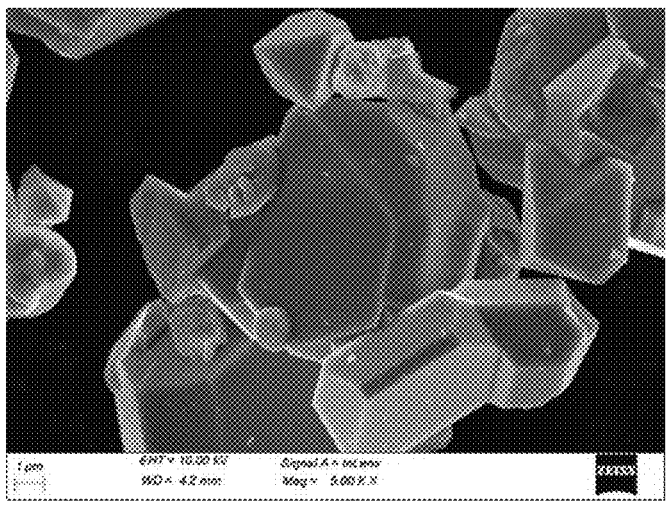
FIG. 8 is a scanning electron micrograph of the lithium nickel manganese-containing composite oxide prepared by Comparative Example 1.

In the preparation of lithium nickel manganese-containing composite oxides in Comparative Examples 1 and 2, only one sintering process was used, and the prepared lithium nickel manganese-containing composite oxides had a quasi-monocrystal particle morphology and an octahedral grain shape. As shown in FIG. 8, the grains have sharp edges, so that stress corrosion at high voltage is more serious, and it is not resistant to corrosion of strong acids in the electrolytic solution, and manganese ions are leached out seriously, which leads to a shorter cycling life of the secondary battery.

Figure 9:
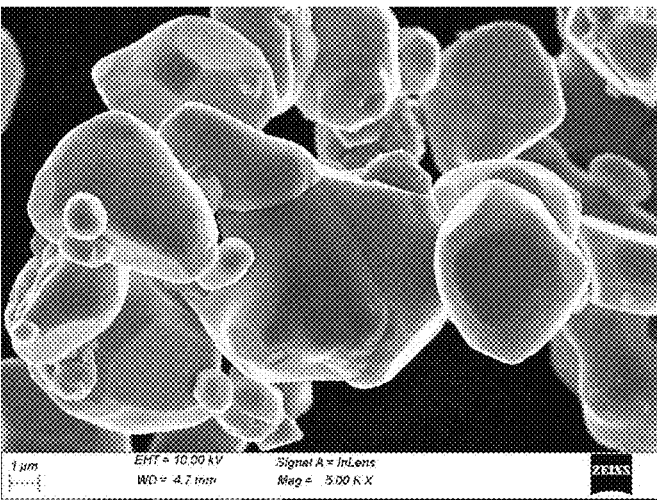
FIG. 9 is a scanning electron micrograph of the lithium nickel manganese-containing composite oxide prepared by Comparative Example 5.

In the preparation of lithium nickel manganese-containing composite oxide in Comparative Example 3, two discontinuous sintering processes are used, but the temperature of the second sintering is less than 800° C., and the prepared lithium nickel manganese-containing composite oxide has a single crystal particle morphology and an octahedral grain shape. In the preparation of lithium nickel manganese-containing composite oxide in Comparative Example 4, two discontinuous sintering processes are used, but the temperature of the second sintering is higher than that of the first sintering, and the prepared lithium nickel manganese-containing composite oxide has a single crystal particle morphology and an octahedral grain shape. In the preparation of lithium nickel manganese-containing composite oxide in Comparative Example 5, two discontinuous sintering processes are used, but the difference between the first sintering temperature and the second sintering temperature is greater than 200° C. As shown in FIG. 9, and the prepared lithium nickel manganese-containing composite oxide has a single crystal particle morphology and a rounded octahedral grain shape The cycling performance of the lithium nickel manganese-containing composite oxide prepared in Comparative Examples 3 to 5 are slightly improved compared to that of Comparative Example 1, but the improvement is not significant.

In the preparation of the lithium nickel manganese-containing composite oxide in Comparative Example 6 and Comparative Example 7, an excessive amount of the doping element M and the doping element A is used, respectively, thereby resulting in a significant decrease in the initial discharging capacity of the secondary battery.

It should be noted that this application is not limited to the above embodiments. The above embodiments are only provided as examples, and within the technical solution of the present application, embodiments having substantially the same configuration as the technical idea and exerting the same effects are all included within the technical scope of the present application. In addition, various modifications to the embodiments that can be conceived by those skilled in the art without departing from the scope of the spirit of the present application and other embodiments constructed by combining some constituent elements in the embodiments are also included in the scope of the present application.

TABLE 1

| No. | Lithium nickel manganese-containing composite oxide | Source of element Li | Source of elements Ni and Mn | Source of element M | Source of element A |
|---|---|---|---|---|---|
| Example 1 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 2 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 3 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 4 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 5 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 6 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 7 | $LiNi_{0.5}Mn_{1.35}Te_{0.05}P_{0.1}O_4$ | $Li_2CO_3$ | $Ni_{0.5}Mn_{1.35}(OH)_{3.7}$ | $TeO_2$ | $NH_4H_2PO_4$ |
| Example 8 | $LiNi_{0.5}Mn_{1.35}Te_{0.05}P_{0.05}O_4$ | $Li_2CO_3$ | $Ni_{0.5}Mn_{1.35}(OH)_{3.7}$ | $TeO_2$ | $NH_4H_2PO_4$ |
| Example 9 | $LiNi_{0.5}Mn_{1.35}Te_{0.05}P_{0.15}O_4$ | $Li_2CO_3$ | $Ni_{0.5}Mn_{1.35}(OH)_{3.7}$ | $TeO_2$ | $NH_4H_2PO_4$ |
| Example 10 | $LiNi_{0.5}Mn_{1.35}Te_{0.1}P_{0.1}O_4$ | $Li_2CO_3$ | $Ni_{0.5}Mn_{1.35}(OH)_{3.7}$ | $TeO_2$ | $NH_4H_2PO_4$ |
| Example 11 | $LiNi_{0.5}Mn_{1.35}Te_{0.02}P_{0.05}O_4$ | $Li_2CO_3$ | $Ni_{0.5}Mn_{1.35}(OH)_{3.7}$ | $TeO_2$ | $NH_4H_2PO_4$ |
| Example 12 | $LiNi_{0.5}Mn_{1.35}Te_{0.02}P_{0.1}O_4$ | $Li_2CO_3$ | $Ni_{0.5}Mn_{1.35}(OH)_{3.7}$ | $TeO_2$ | $NH_4H_2PO_4$ |
| Example 13 | $LiNi_{0.5}Mn_{1.35}Te_{0.05}Si_{0.1}O_4$ | $Li_2CO_3$ | $Ni_{0.5}Mn_{1.35}(OH)_{3.7}$ | $TeO_2$ | $SiO_2$ |
| Example 14 | $LiNi_{0.5}Mn_{1.35}Te_{0.05}S_{0.1}O_4$ | $Li_2CO_3$ | $Ni_{0.5}Mn_{1.35}(OH)_{3.7}$ | $TeO_2$ | $Li_2S$ |
| Example 15 | $LiNi_{0.5}Mn_{1.35}Nb_{0.05}P_{0.1}O_4$ | $Li_2CO_3$ | $Ni_{0.5}Mn_{1.35}(OH)_{3.7}$ | $Nb_2O_5$ | $NH_4H_2PO_4$ |
| Example 16 | $LiNi_{0.5}Mn_{1.35}Ru_{0.05}P_{0.1}O_4$ | $Li_2CO_3$ | $Ni_{0.5}Mn_{1.35}(OH)_{3.7}$ | $RuO_2$ | $NH_4H_2PO_4$ |
| Example 17 | $LiNi_{0.5}Mn_{1.35}Mo_{0.05}P_{0.1}O_4$ | $Li_2CO_3$ | $Ni_{0.5}Mn_{1.35}(OH)_{3.7}$ | $MoO_3$ | $NH_4H_2PO_4$ |
| Example 18 | $LiNi_{0.5}Mn_{1.35}Ta_{0.05}P_{0.1}O_4$ | $Li_2CO_3$ | $Ni_{0.5}Mn_{1.35}(OH)_{3.7}$ | $Ta_2O_5$ | $NH_4H_2PO_4$ |
| Example 19 | $LiNi_{0.5}Mn_{1.35}Ce_{0.05}P_{0.1}O_4$ | $Li_2CO_3$ | $Ni_{0.5}Mn_{1.35}(OH)_{3.7}$ | $CeO_2$ | $NH_4H_2PO_4$ |
| Example 20 | $LiNi_{0.5}Mn_{1.35}Yb_{0.05}P_{0.1}O_4$ | $Li_2CO_3$ | $Ni_{0.5}Mn_{1.35}(OH)_{3.7}$ | $Yb_2O_3$ | $NH_4H_2PO_4$ |
| Example 21 | $LiNi_{0.5}Mn_{1.35}Te_{0.025}Ta_{0.025}P_{0.1}O_4$ | $Li_2CO_3$ | $Ni_{0.5}Mn_{1.35}(OH)_{3.7}$ | $TeO_2 +$ | $NH_4H_2PO_4$ |

TABLE 1-continued

| No. | | Li source | Hydroxide | Oxide | P source |
|---|---|---|---|---|---|
| Example 22 | LiNi$_{0.5}$Mn$_{1.35}$Te$_{0.025}$Nb$_{0.025}$P$_{0.1}$O$_4$ | Li$_2$CO$_3$ | Ni$_{0.5}$Mn$_{1.35}$(OH)$_{3.7}$ | Ta$_2$O$_5$ TeO$_2$ + Nb$_2$O$_5$ | NH$_4$H$_2$PO$_4$ |
| Example 23 | LiNi$_{0.5}$Mn$_{1.35}$Nb$_{0.025}$Ce$_{0.025}$P$_{0.1}$O$_4$ | Li$_2$CO$_3$ | Ni$_{0.5}$Mn$_{1.35}$(OH)$_{3.7}$ | Nb$_2$O$_5$ + CeO$_2$ | NH$_4$H$_2$PO$_4$ |
| Example 24 | LiNi$_{0.5}$Mn$_{1.35}$W$_{0.05}$P$_{0.1}$O$_4$ | Li$_2$CO$_3$ | Ni$_{0.5}$Mn$_{1.35}$(OH)$_{3.7}$ | WO$_3$ | NH$_4$H$_2$PO$_4$ |
| Example 25 | LiNi$_{0.5}$Mn$_{1.35}$Y$_{0.05}$P$_{0.1}$O$_4$ | Li$_2$CO$_3$ | Ni$_{0.5}$Mn$_{1.35}$(OH)$_{3.7}$ | Y$_2$O$_3$ | NH$_4$H$_2$PO$_4$ |
| Example 26 | LiNi$_{0.5}$Mn$_{1.35}$Cr$_{0.05}$P$_{0.1}$O$_4$ | Li$_2$CO$_3$ | Ni$_{0.5}$Mn$_{1.35}$(OH)$_{3.7}$ | Cr$_2$O$_3$ | NH$_4$H$_2$PO$_4$ |
| Example 27 | LiNi$_{0.5}$Mn$_{1.35}$Ti$_{0.05}$P$_{0.1}$O$_4$ | Li$_2$CO$_3$ | Ni$_{0.5}$Mn$_{1.35}$(OH)$_{3.7}$ | TiO$_2$ | NH$_4$H$_2$PO$_4$ |
| Example 28 | LiNi$_{0.5}$Mn$_{1.35}$Mg$_{0.05}$P$_{0.1}$O$_4$ | Li$_2$CO$_3$ | Ni$_{0.5}$Mn$_{1.35}$(OH)$_{3.7}$ | MgO | NH$_4$H$_2$PO$_4$ |
| Example 29 | LiNi$_{0.5}$Mn$_{1.4}$P$_{0.1}$O$_4$ | Li$_2$CO$_3$ | Ni$_{0.5}$Mn$_{1.4}$(OH)$_{3.8}$ | / | NH$_4$H$_2$PO$_4$ |
| Example 30 | LiNi$_{0.5}$Mn$_{1.35}$Te$_{0.05}$P$_{0.1}$O$_4$ | Li$_2$CO$_3$ | Ni$_{0.5}$Mn$_{1.35}$(OH)$_{3.7}$ | TeO$_2$ | NH$_4$H$_2$PO$_4$ |
| Comparative Example 1 | LiNi$_{0.5}$Mn$_{1.5}$O$_4$ | Li$_2$CO$_3$ | Ni$_{0.5}$Mn$_{1.5}$(OH)$_4$ | / | / |
| Comparative Example 2 | LiNi$_{0.5}$Mn$_{1.45}$Te$_{0.05}$O$_4$ | Li$_2$CO$_3$ | Ni$_{0.5}$Mn$_{1.45}$(OH)$_{3.9}$ | TeO$_2$ | / |
| Comparative Example 3 | LiNi$_{0.5}$Mn$_{1.35}$Te$_{0.05}$P$_{0.1}$O$_4$ | Li$_2$CO$_3$ | Ni$_{0.5}$Mn$_{1.35}$(OH)$_{3.7}$ | TeO$_2$ | NH$_4$H$_2$PO$_4$ |
| Comparative Example 4 | LiNi$_{0.5}$Mn$_{1.35}$Te$_{0.05}$P$_{0.1}$O$_4$ | Li$_2$CO$_3$ | Ni$_{0.5}$Mn$_{1.35}$(OH)$_{3.7}$ | TeO$_2$ | NH$_4$H$_2$PO$_4$ |
| Comparative Example 5 | LiNi$_{0.5}$Mn$_{1.35}$Te$_{0.05}$P$_{0.1}$O$_4$ | Li$_2$CO$_3$ | Ni$_{0.5}$Mn$_{1.35}$(OH)$_{3.7}$ | TeO$_2$ | NH$_4$H$_2$PO$_4$ |
| Comparative Example 6 | LiNi$_{0.5}$Mn$_{1.15}$Te$_{0.25}$P$_{0.1}$O$_4$ | Li$_2$CO$_3$ | Ni$_{0.5}$Mn$_{1.15}$(OH)$_{3.3}$ | TeO$_2$ | NH$_4$H$_2$PO$_4$ |
| Comparative Example 7 | LiNi$_{0.5}$Mn$_{1.2}$Te$_{0.05}$P$_{0.25}$O$_4$ | Li$_2$CO$_3$ | Ni$_{0.5}$Mn$_{1.2}$(OH)$_{3.4}$ | TeO$_2$ | NH$_4$H$_2$PO$_4$ |

| No. | First temperature T1 (° C.) | First time t1 (h) | Second temperature T2 (° C.) | Second time t2 (h) | T1 − T2 (° C.) | z + a | a/z |
|---|---|---|---|---|---|---|---|
| Example 1 | 950 | 20 | 850 | 10 | 100 | 0.15 | 2 |
| Example 2 | 950 | 20 | 900 | 3 | 50 | 0.15 | 2 |
| Example 3 | 950 | 20 | 950 | 1 | 0 | 0.15 | 2 |
| Example 4 | 950 | 20 | 800 | 20 | 150 | 0.15 | 2 |
| Example 5 | 1050 | 5 | 950 | 5 | 100 | 0.15 | 2 |
| Example 6 | 1100 | 3 | 900 | 10 | 200 | 0.15 | 2 |
| Example 7 | 850 | 50 | 800 | 20 | 50 | 0.15 | 2 |
| Example 8 | 950 | 20 | 900 | 3 | 50 | 0.10 | 1 |
| Example 9 | 950 | 20 | 900 | 3 | 50 | 0.20 | 3 |
| Example 10 | 950 | 20 | 900 | 3 | 50 | 0.20 | 1 |
| Example 11 | 950 | 20 | 900 | 3 | 50 | 0.07 | 2.5 |
| Example 12 | 950 | 20 | 900 | 3 | 50 | 0.12 | 5 |
| Example 13 | 950 | 20 | 900 | 3 | 50 | 0.15 | 2 |
| Example 14 | 950 | 20 | 900 | 3 | 50 | 0.15 | 2 |
| Example 15 | 950 | 20 | 900 | 3 | 50 | 0.15 | 2 |
| Example 16 | 950 | 20 | 900 | 3 | 50 | 0.15 | 2 |
| Example 17 | 950 | 20 | 900 | 3 | 50 | 0.15 | 2 |
| Example 18 | 950 | 20 | 900 | 3 | 50 | 0.15 | 2 |
| Example 19 | 950 | 20 | 900 | 3 | 50 | 0.15 | 2 |
| Example 20 | 950 | 20 | 900 | 3 | 50 | 0.15 | 2 |
| Example 21 | 950 | 20 | 900 | 3 | 50 | 0.15 | 2 |
| Example 22 | 950 | 20 | 900 | 3 | 50 | 0.15 | 2 |
| Example 23 | 950 | 20 | 900 | 3 | 50 | 0.15 | 2 |
| Example 24 | 950 | 20 | 900 | 3 | 50 | 0.15 | 2 |
| Example 25 | 950 | 20 | 900 | 3 | 50 | 0.15 | 2 |
| Example 26 | 950 | 20 | 900 | 3 | 50 | 0.15 | 2 |
| Example 27 | 950 | 20 | 900 | 3 | 50 | 0.15 | 2 |
| Example 28 | 950 | 20 | 900 | 3 | 50 | 0.15 | 2 |
| Example 29 | 950 | 20 | 900 | 3 | 50 | 0.10 | / |
| Example 30 | 950 | 20 | 900 | 3 | 50 | 0.15 | 2 |
| Comparative Example 1 | 950 | 20 | / | / | / | / | / |
| Comparative Example 2 | 950 | 20 | / | / | / | 0.15 | 2 |
| Comparative Example 3 | 950 | 20 | 760 | 20 | 190 | 0.15 | 2 |
| Comparative Example 4 | 950 | 20 | 1000 | 1 | −50 | 0.15 | 2 |
| Comparative Example 5 | 1050 | 5 | 800 | 20 | 250 | 0.15 | 2 |
| Comparative Example 6 | 950 | 20 | 900 | 3 | 50 | 0.35 | 0.4 |
| Comparative Example 7 | 950 | 20 | 900 | 3 | 50 | 0.30 | 5 |

TABLE 2

| No. | Morphology | Ratio of long diameter/short diameter L/S | Volume particle size Dv50 (μm) | BET specific surface area (m²/g) | Tap density (g/cm³) | 4 V plateau charging capacity ratio R | Initial discharging capacity (mAh/g) | Number of cycles at high temperature |
|---|---|---|---|---|---|---|---|---|
| Example 1 | Rounded spherical-like grain shape, and monocrystal particle morphology | 1.20 | 7.6 | 0.447 | 1.88 | 0.073 | 124 | 639 |
| Example 2 | Rounded spherical-like grain shape, and monocrystal particle morphology | 1.12 | 8.2 | 0.400 | 2.04 | 0.091 | 122 | 758 |
| Example 3 | Rounded spherical-like grain shape, and monocrystal particle morphology | 1.01 | 8.8 | 0.354 | 2.29 | 0.103 | 121 | 897 |
| Example 4 | Rounded spherical-like grain shape, and monocrystal particle morphology | 1.24 | 7.3 | 0.473 | 1.80 | 0.057 | 125 | 570 |
| Example 5 | Rounded spherical-like grain shape, and monocrystal particle morphology | 1.09 | 12.4 | 0.261 | 2.28 | 0.112 | 118 | 917 |
| Example 6 | Rounded spherical-like grain shape, and monocrystal particle morphology | 1.23 | 15.8 | 0.218 | 2.12 | 0.124 | 116 | 866 |
| Example 7 | Rounded spherical-like grain shape, and quasi-monocrystal particle morphology | 1.18 | 5.7 | 0.591 | 1.80 | 0.026 | 128 | 545 |
| Example 8 | Rounded spherical-like grain shape, and monocrystal particle morphology | 1.22 | 7.7 | 0.445 | 1.83 | 0.072 | 126 | 634 |
| Example 9 | Rounded spherical-like grain shape, and monocrystal particle morphology | 1.18 | 7.3 | 0.461 | 1.90 | 0.075 | 123 | 768 |
| Example 10 | Rounded spherical-like grain shape, and monocrystal particle morphology | 1.17 | 7.2 | 0.466 | 1.91 | 0.076 | 124 | 688 |
| Example 11 | Rounded spherical-like grain shape, and monocrystal particle morphology | 1.23 | 7.8 | 0.441 | 1.82 | 0.071 | 127 | 645 |
| Example 12 | Rounded spherical-like grain shape, and monocrystal particle morphology | 1.20 | 7.6 | 0.447 | 1.87 | 0.074 | 124 | 650 |
| Example 13 | Rounded spherical-like grain shape, and monocrystal particle morphology | 1.08 | 8.7 | 0.370 | 2.14 | 0.087 | 123 | 798 |
| Example 14 | Rounded spherical-like grain shape, and monocrystal particle morphology | 1.10 | 8.5 | 0.383 | 2.09 | 0.082 | 126 | 724 |
| Example 15 | Rounded spherical-like grain shape, and monocrystal particle morphology | 1.14 | 7.9 | 0.419 | 1.99 | 0.104 | 120 | 696 |
| Example 16 | Rounded spherical-like grain shape, and monocrystal particle morphology | 1.09 | 8.4 | 0.385 | 2.11 | 0.079 | 125 | 792 |
| Example 17 | Rounded spherical-like grain shape, and monocrystal particle morphology | 1.15 | 7.8 | 0.426 | 1.97 | 0.094 | 121 | 658 |

TABLE 2-continued

| No. | Morphology | Ratio of long diameter/short diameter L/S | Volume particle size Dv50 (μm) | BET specific surface area (m²/g) | Tap density (g/cm³) | 4 V plateau charging capacity ratio R | Initial discharging capacity (mAh/g) | Number of cycles at high temperature |
|---|---|---|---|---|---|---|---|---|
| Example 18 | Rounded spherical-like grain shape, and monocrystal particle morphology | 1.13 | 8.1 | 0.407 | 2.02 | 0.081 | 123 | 731 |
| Example 19 | Rounded spherical-like grain shape, and monocrystal particle morphology | 1.11 | 8.2 | 0.398 | 2.06 | 0.086 | 124 | 762 |
| Example 20 | Rounded spherical-like grain shape, and monocrystal particle morphology | 1.13 | 8.4 | 0.392 | 2.03 | 0.081 | 123 | 735 |
| Example 21 | Rounded spherical-like grain shape, and monocrystal particle morphology | 1.07 | 8.3 | 0.386 | 2.14 | 0.076 | 125 | 836 |
| Example 22 | Rounded spherical-like grain shape, and monocrystal particle morphology | 1.09 | 8.1 | 0.400 | 2.09 | 0.074 | 126 | 823 |
| Example 23 | Rounded spherical-like grain shape, and monocrystal particle morphology | 1.08 | 8.2 | 0.393 | 2.12 | 0.077 | 126 | 879 |
| Example 24 | Rounded spherical-like grain shape, and monocrystal particle morphology | 1.17 | 6.9 | 0.486 | 1.89 | 0.094 | 123 | 586 |
| Example 25 | Rounded spherical-like grain shape, and monocrystal particle morphology | 1.18 | 7.1 | 0.474 | 1.88 | 0.093 | 123 | 583 |
| Example 26 | Rounded spherical-like grain shape, and monocrystal particle morphology | 1.19 | 7.1 | 0.476 | 1.87 | 0.086 | 126 | 509 |
| Example 27 | Rounded spherical-like grain shape, and monocrystal particle morphology | 1.18 | 6.8 | 0.495 | 1.87 | 0.098 | 127 | 498 |
| Example 28 | Rounded spherical-like grain shape, and monocrystal particle morphology | 1.18 | 8.1 | 0.416 | 1.73 | 0.089 | 121 | 559 |
| Example 29 | Rounded spherical-like grain shape, and monocrystal particle morphology | 1.20 | 6.5 | 0.522 | 1.82 | 0.094 | 124 | 514 |
| Example 30 | Rounded spherical-like grain shape, and monocrystal particle morphology | 1.10 | 6.3 | 0.516 | 1.96 | 0.031 | 128 | 637 |
| Comparative Example 1 | Octahedral grain shape, and quasi-monocrystal particle morphology | 1.36 | 8.5 | 0.425 | 1.68 | 0.107 | 130 | 302 |
| Comparative Example 2 | Octahedral grain shape, and quasi-monocrystal particle morphology | 1.34 | 8.2 | 0.438 | 1.71 | 0.105 | 125 | 431 |
| Comparative Example 3 | Octahedral grain shape, and monocrystal particle morphology | 1.26 | 7.2 | 0.483 | 1.81 | 0.050 | 126 | 441 |
| Comparative Example 4 | Octahedral grain shape, and monocrystal particle morphology | 1.37 | 8.3 | 0.437 | 1.63 | 0.182 | 124 | 372 |
| Comparative Example 5 | Rounded octahedral grain shape, and monocrystal particle morphology | 1.28 | 11.9 | 0.295 | 1.87 | 0.093 | 120 | 557 |
| Comparative Example 6 | Rounded spherical-like grain shape, and | 1.08 | 7.3 | 0.441 | 2.05 | 0.174 | 106 | 692 |

TABLE 2-continued

| No. | Morphology | Ratio of long diameter/short diameter L/S | Volume particle size Dv50 (μm) | BET specific surface area (m²/g) | Tap density (g/cm³) | 4 V plateau charging capacity ratio R | Initial discharging capacity (mAh/g) | Number of cycles at high temperature |
|---|---|---|---|---|---|---|---|---|
| Comparative Example 7 | monocrystal particle morphology Rounded spherical-like grain shape, and monocrystal particle morphology | 1.02 | 6.1 | 0.513 | 2.10 | 0.158 | 107 | 787 |

What is claimed is:

1. A lithium nickel manganese-containing composite oxide, wherein the lithium nickel manganese-containing composite oxide is a particle with a monocrystal morphology or a quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, $-0.2 \leq x \leq 0.5$, $-0.2 \leq y \leq 0.2$, $0 \leq z \leq 0.2$, $0 \leq a \leq 0.2$, $0 \leq k \leq 0.2$, A comprises one or more selected from Si, P and S, M comprises one or more selected from a metal-doping element.

2. The lithium nickel manganese-containing composite oxide according to claim 1, wherein a ratio of long diameter L to short diameter S of the lithium nickel manganese-containing composite oxide grain satisfies $1.0 \leq L/S \leq 1.25$, and/or wherein M comprises one or more selected from Mo, Nb, Ru, Te, Ta, Ce, and Yb.

3. The lithium nickel manganese-containing composite oxide according to claim 1, wherein, $$0.01 \leq a \leq 0.2; \text{ and/or,}$$

$$0 < z \leq 0.20.$$

4. The lithium nickel manganese-containing composite oxide according to claim 1, wherein, $$0.01 \leq z + a \leq 0.2; \text{ and/or,}$$

$$0 < z \leq 0.2 \text{ and } 1 \leq a/z \leq 5,$$

and/or wherein the lithium nickel manganese-containing composite oxide has a 4V plateau charging capacity ratio R satisfying $0 < R \leq 0.125$, the 4V plateau charging capacity ratio R of the lithium nickel manganese-containing composite oxide is measured as follows: assembling a button battery with an electrode plate comprising the lithium nickel manganese-containing composite oxide as a positive electrode and a lithium plate as a negative electrode, charging the battery to 4.95V at a current of 0.1C, and then charging to a current of 0.05C at the constant voltage, using a ratio of the charging capacity in the range of 3.5V to 4.4V to the total charging capacity of the button battery as the 4V plateau charging capacity ratio R of the lithium nickel manganese-containing composite oxide.

5. The lithium nickel manganese-containing composite oxide according to claim 1, wherein the lithium nickel manganese-containing composite oxide satisfies at least one of the following conditions (1) to (3):

(1) the lithium nickel manganese-containing composite oxide has a volume particle size Dv50 satisfying 3 μm $\leq$ Dv50 $\leq$ 16 μm;

(2) the lithium nickel manganese-containing composite oxide has a BET specific surface area S0 of $\leq 0.8$ m²/g;

(3) the lithium nickel manganese-containing composite oxide has a tap density TD satisfying 1.5 g/cm³ $\leq$ TD $\leq$ 3.0 g/cm³.

6. The lithium nickel manganese-containing composite oxide according to claim 1, wherein the lithium nickel manganese-containing composite oxide further has a cladding layer on the surface, the cladding layer comprises one or more selected from a conductive carbon material, a metal oxide, a metal fluoride and a polyanionic material, optionally, the conductive carbon material comprises one or more selected from soft carbon, hard carbon, graphene and graphene oxide, optionally, the metal oxide comprises one or more selected from $Al_2O_3$, $B_2O_3$, $TiO_2$, $ZrO_2$, $WO_3$, $MoO_3$, $Y_2O_3$, $Ta_2O_5$, $TeO_2$, and $Nb_2O_5$, optionally, the metal fluoride comprises one or more selected from $LiF$, $AlF_3$, and $GaF_3$, optionally, the polyanionic material comprises one or more selected from orthophosphates and fluoro-orthophosphates of at least one element of Li, Ni, Co, Mn, Fe, Nb, Mo, W, Ta and Te.

7. A preparation method of a lithium nickel manganese-containing composite oxide comprising the following steps:

S1: providing a raw material obtained by mixing a source of element Li, a source of element Ni, a source of element Mn, a source of element A, and an optional source of element M in a predetermined proportion;

S2: heating the raw material obtained in S1 to a first temperature T1 under an oxygen-containing atmosphere, maintaining at the first temperature T1 for a first time t1, cooling to room temperature, after which a intermediate product is obtained, 850° C. $\leq$ T1 $\leq$ 1100° C.; and S3: heating the intermediate product obtained in S2 to a second temperature T2 under an oxygen-containing atmosphere, maintaining at the second temperature T2 for a second time t2, after which a lithium nickel manganese-containing composite oxide is obtained, 0° C. $\leq$ T1−T2 $\leq$ 200° C., and T2 $\geq$ 800° C., wherein the lithium nickel manganese-containing composite oxide is a particle with a monocrystal morphology or quasi-monocrystal morphology, the lithium nickel manganese-containing composite oxide has a spherical or spherical-like grain shape, and the lithium nickel manganese-containing composite oxide has a general formula of $Li_{1+x}Ni_{0.5+y}M_zMn_{1.5-x-y-z-a}A_aO_{4-k}$, −0.2≤x≤0.5, −0.2≤y≤0.2, 0≤z≤0.2, 0<a≤0.2, 0≤k≤0.2, A comprises one or more selected from Si, P and S, M comprises one or more selected from a metal-doping element.

8. The preparation method according to claim 7, wherein, $$900° \text{ C.} \leq T1 \leq 1100° \text{ C.; and/or,}$$

$$0° \text{ C.} \leq T1 - T2 \leq 100° \text{ C., and } 850° \text{ C.} \leq T2 \leq 1000° \text{ C.}$$

9. The preparation method according to claim 7, wherein, t2≤t1.

10. The preparation method according to claim 7, wherein, $$2 \text{ h} \leq t1 \leq 50 \text{ h; and/or,}$$

$$0.5 \text{ h} \leq t2 \leq 20 \text{ h; and/or,}$$

$$10 \text{ h} \leq t1 + t2 \leq 40 \text{ h.}$$

11. The preparation method according to claim 7, further comprising a step S4: annealing the product obtained in S3 to obtain a lithium nickel manganese-containing composite oxide, optionally, the annealing temperature is 500° C. to 800° C., optionally, the annealing time is 5 h-50 h and optionally further comprising steps: after mixing the lithium nickel manganese-containing composite oxide obtained in S4 with a cladding agent, sintering under a protective gas atmosphere to obtain a lithium nickel manganese-containing composite oxide with cladding layer, optionally, the cladding agent is a precursor compound for forming one or more of a conductive carbon material, a metal oxide, a metal fluoride, and a polyanionic material.

12. The preparation method according to claim 7, further comprising steps:

after mixing the lithium nickel manganese-containing composite oxide obtained in S3 with a cladding agent, sintering under a protective gas atmosphere to obtain a lithium nickel manganese-containing composite oxide with cladding layer, optionally, the cladding agent is a precursor compound for forming one or more of a conductive carbon material, a metal oxide, a metal fluoride, and a polyanionic material.

13. A positive electrode plate comprising a positive electrode current collector and a positive electrode film layer provided on at least one surface of the positive electrode current collector, wherein the positive electrode film layer comprises the lithium nickel manganese-containing composite oxide according to claim 1, and the lithium nickel manganese-containing composite oxide is present in the positive electrode film layer in a content of 1 wt % to 99 wt % based on total weight of the positive electrode film layer.

14. A secondary battery comprising the positive electrode plate according to claim 13.

15. An electrical device comprising the secondary battery according to claim 5.

\* \* \* \* \*